No. 827,089. PATENTED JULY 31, 1906.
T. A. EDISON.
CALCINING FURNACE.
APPLICATION FILED JAN. 2, 1902.

Witnesses:

Inventor
Thomas A. Edison
by Dyer Edmonds & Dyer
Attorneys

No. 827,089. PATENTED JULY 31, 1906.
T. A. EDISON.
CALCINING FURNACE.
APPLICATION FILED JAN. 2, 1902.

Witnesses: Jas. F. Coleman, Jno Robt Taylor

Inventor Thomas A Edison
by Dyer Edmonds & Dyer
Attorneys

No. 827,089. PATENTED JULY 31, 1906.
T. A. EDISON.
CALCINING FURNACE.
APPLICATION FILED JAN. 2, 1902.

Witnesses:
Jas. F. Coleman
Ino. Robt. Taylor

Inventor
Thomas A Edison
by Dyer Edmond
Attorneys

No. 827,089. PATENTED JULY 31, 1906.
T. A. EDISON.
CALCINING FURNACE.
APPLICATION FILED JAN. 2, 1902.

No. 827,089. PATENTED JULY 31, 1906.
T. A. EDISON.
CALCINING FURNACE.
APPLICATION FILED JAN. 2, 1902.

UNITED STATES PATENT OFFICE.

THOMAS A. EDISON, OF LLEWELLYN PARK, NEW JERSEY.

CALCINING-FURNACE.

No. 827,089.  Specification of Letters Patent.  Patented July 31, 1906.

Application filed January 2, 1902. Serial No. 88,108.

*To all whom it may concern:*

Be it known that I, THOMAS ALVA EDISON, a citizen of the United States, residing at Llewellyn Park, Orange, Essex county, State of New Jersey, have invented a certain new and useful Improvement in Calcining-Furnaces, (Case No. 1,067,) of which the following is a description.

My invention relates to improvements in calcining-furnaces, which are particularly designed for use in the burning of cement-clinker, but which can be employed in other arts.

My object is to provide a relatively simple apparatus which shall be practically automatic in operation and wherein the desired material may be burned, calcined, or incinerated efficiently and economically.

To this end the invention comprises, first, one or more rotary cylindrical burners arranged, when a plurality are employed, preferably in a horizontal bank, said burners being of novel construction and operation; second, means for automatically supplying pulverized fuel to each burner at one end; third, means for automatically introducing the material to be calcined or incinerated at the other end, and, fourth, suitable regenerative appliances by means of which a part of the heat in the burned material may be imparted to the air which enters the burner to effect the combustion therein and a part of the heat which would otherwise be lost in the combustion-gases may be conserved by effecting a further heating of such air.

The invention relates also to details of construction of many of the devices constituting the apparatus—as, for example, of the burners themselves with the devices coöperating directly therewith, of the devices for feeding the pulverized fuel to the burners, of the devices for feeding the unburned material to the burners, and of such other of the elements of the apparatus as will be referred to more in detail hereinafter.

Under the present practice the material is introduced into cement-burning kilns by gravity, the delivery-pipe being arranged at an angle to the longitudinal axis of the kiln and terminating at a considerable distance above the bottom thereof, so that the material is required to fall through the exit-gases, leaving the kiln before reaching the bottom. The delivery-pipe in the present kilns is heavily water-jacketed in order to be protected from the very high temperature of the escaping gases. Owing to the low specific gravity of the unburned material, it settles very slowly along the bottom of the kiln, and consequently a portion of the material will be carried out of the kiln with the draft. A part of the light unburned material which is thus carried out of the kiln passes up the stack with the draft and is lost, while the remainder settles by its weight in the chamber beneath the stack and is allowed to accumulate in a dust-chamber, which requires to be cleaned out from time to time. Thus the feeding of the unburned material under the present practice is wasteful and uneconomical. With my improved apparatus I force the unburned material into the upper end of the kiln by means of a suitable conveyer, which is arranged substantially parallel and close to the bottom of the kiln, so that the material has no opportunity to fall and create dust, but is packed into the kiln in successive increments. With kilns in which the escaping gases are at a relatively low temperature I find that it is not necessary to water-jacket the conveyer-pipe, as it is sufficiently protected by the large bulk of cooled material constantly passing through it.

In order that the invention may be better understood, attention is directed to the accompanying drawings, forming part of this specification, and in which—

In all of the above views corresponding parts are represented by the same numerals of reference.

1 1 1 represent the rotary burners, preferably arranged in a horizontal bank and each supported on rollers 2, the thrust due to the inclination of these burners being received on a horizontal roller 3 and the burners being driven by suitable gearing 4. Each burner is formed of a metallic shell 5 with a firebrick or other refractory lining 6. Each burner is preferably formed of a series of sections of successively-reduced internal diameter toward the upper end. At their upper smaller ends the burners extend into brick chambers 7, from each of which leads a stack 8. At their lower or larger ends each burner extends into a chamber 9, made of brick. Material is fed to each burner through a trough 10, which is carried on wheels 11 and which contains a screw conveyer 12, operated from a suitable motor 13, electric or otherwise. The trough 10 is introduced through an opening in a partition 14 in the chamber 7, and the end of said trough will therefore actually project within the burner, the trough being substantially parallel with the axis of the burner or kiln and close to the bottom thereof, so that the material is packed into the kiln in successive increments without formation of dust. When each trough is full of the relatively cold material, sufficient radiating capacity is secured to prevent damage from the intense heat within the burner. When, however, the feed of material is stopped, the trough is withdrawn, so as not to be injured by the heat.

Figure 6:
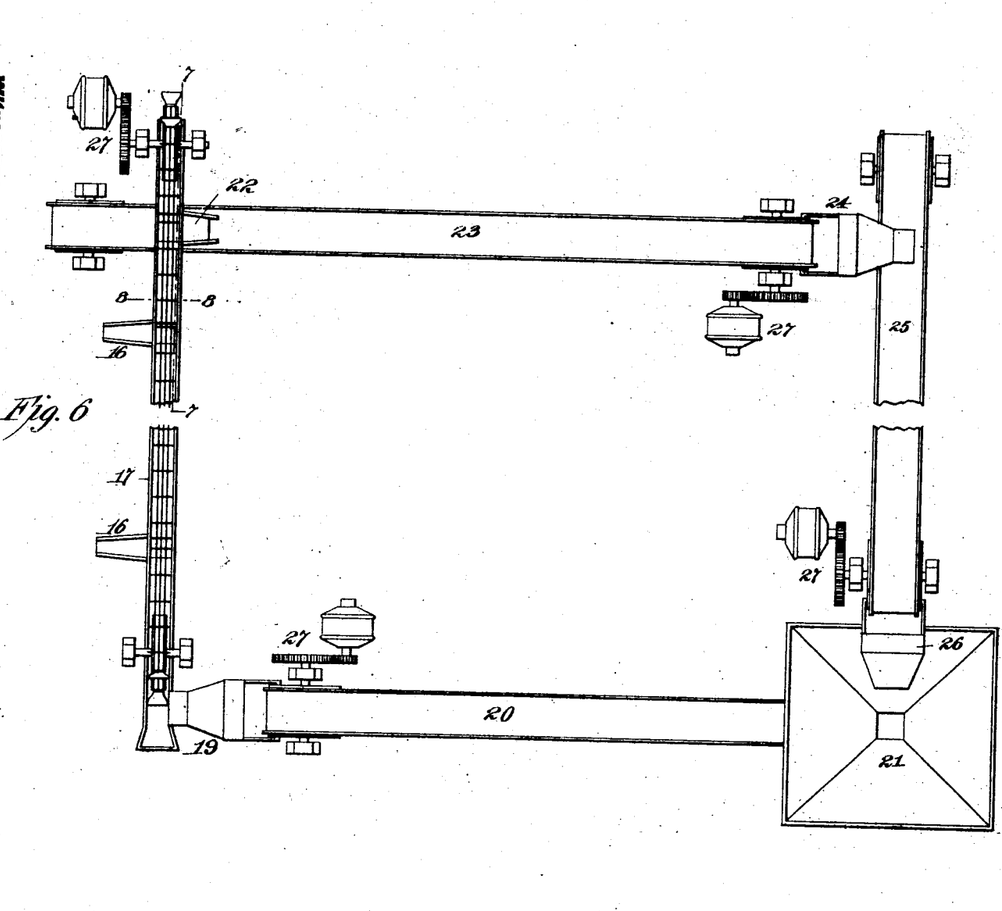
Fig. 6, a plan view of the devices for feeding the material to be calcined to the feed-screws.
Figure 7:
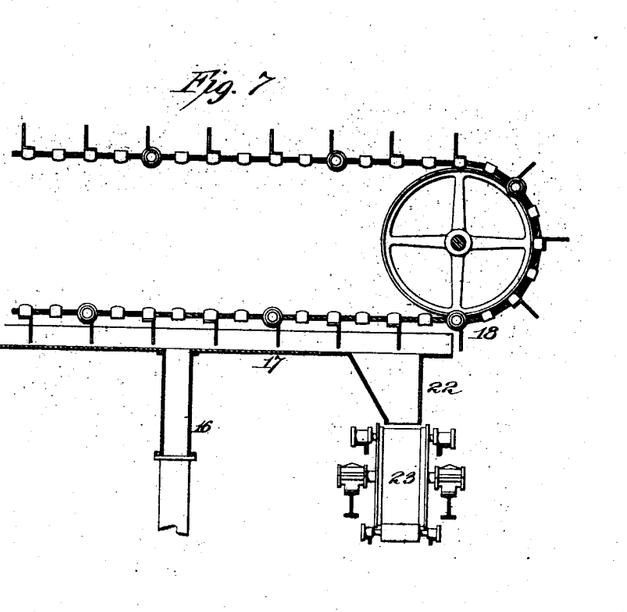
Fig. 7, a section on the line 7 7 of Fig. 6.
Figure 8:
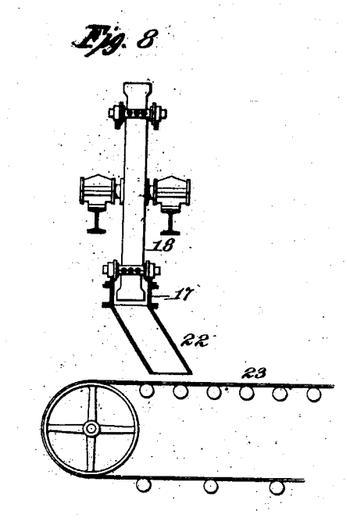
Fig. 8, a section on the line 8 8 of Fig. 6.
Figure 9:
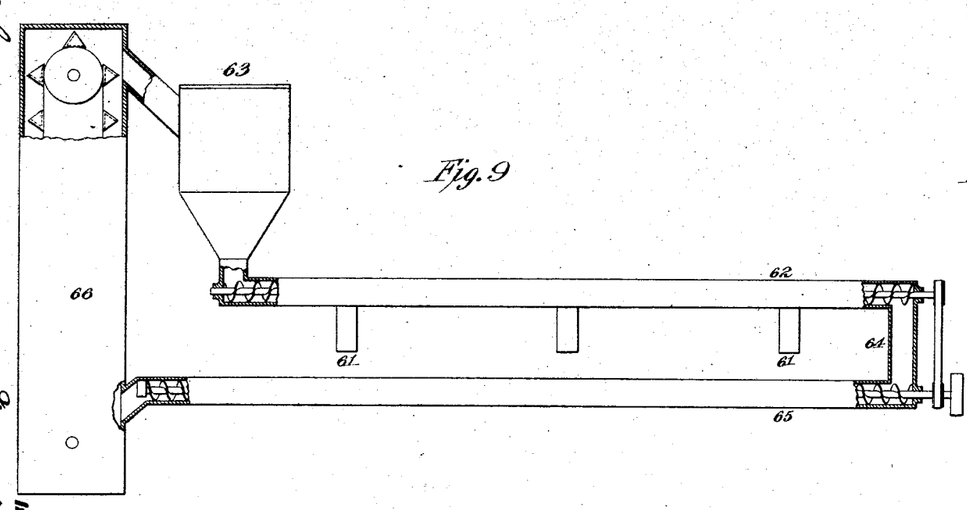
Fig. 9, a detail side elevation showing the feeding mechanism for feeding the pulverized fuel to the hoppers of the several feed-guns.
Figure 10:
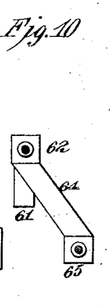
Fig. 10, a detail end elevation of the same.

Each of the troughs 10 is provided with a hopper 15, having an open top of sufficient extent as to be capable of receiving material from a fixed point of supply throughout a considerable range of movement of the trough 10. The hopper 15 is supplied with the material to be calcined or incinerated by any suitable arrangement of feeding devices. I prefer, however, to use an automatic feed, which keeps the hoppers always supplied with the material and which requires absolutely no attention. A convenient example of a satisfactory feeding apparatus for this purpose is shown in Figs. 6, 7, and 8. Extending into each of the hoppers 15 of the feed-trough for each burner is a spout 16, leading out of a conveyer-trough 17, in which work the flights 18 of a scraper conveyer of any suitable type. Leading to the trough of the scraper conveyer at its receiving end is a chute 19, supplied with material from a belt conveyer 20, running under the bottom of a suitable storage-reservoir 21, which is kept supplied with the uncalcined material. Leading from the conveyer-trough 17 near its other end is a chute 22, which connects with a belt conveyer 23, supplying material to a chute 24, leading to a belt conveyer 25, which in turn supplies material to a chute 26, leading into the supply-reservoir 21. I illustrate separate motors 27 for driving the different conveyers referred to.

It will be seen that uncalcined material from the storage-reservoir 21 will be conveyed by the conveyer 20 to the scraper conveyer, and by the latter the material will be scraped along the trough 17, dropping through the spouts 16 and filling the hoppers 15 of the feeding device for each burner. When the material piles up around the bottom of each of the spouts 16, it will no longer flow out of the spout, which will therefore become filled, so that the material will be conveyed to the next spout. Thus it will be seen that the feeding devices of the several burners will be always kept automatically supplied with the desired material. Any surplus material which passes the spout 16 of the last burner in the bank will be carried by the conveyers 23 and 25 back to the reservoir 21. By making the hoppers 15 sufficiently extended the spouts 16 will always be maintained in engagement therewith irrespective of the position of the feeding mechanism, or instead it will be obvious that said spouts might be flexible and connected directly to the troughs 10.

At the rear or larger end of each burner and leading into the chamber 9 is a cooling-cylinder 29, also mounted on rollers and suitably driven by power. An inclined shelf 30 directs the calcined material as it falls out of the bottom of each burner into the corresponding cooling-cylinder. Each cooling-cylinder is provided at its rear end with a stationary back plate 31, having a flap 32 therein, and through which plate extends the discharge-pipe from a blower or fan 33. Mounted below the rear end of each cooling-cylinder is a conveyer 34 for removing the calcined material.

Figure 1:
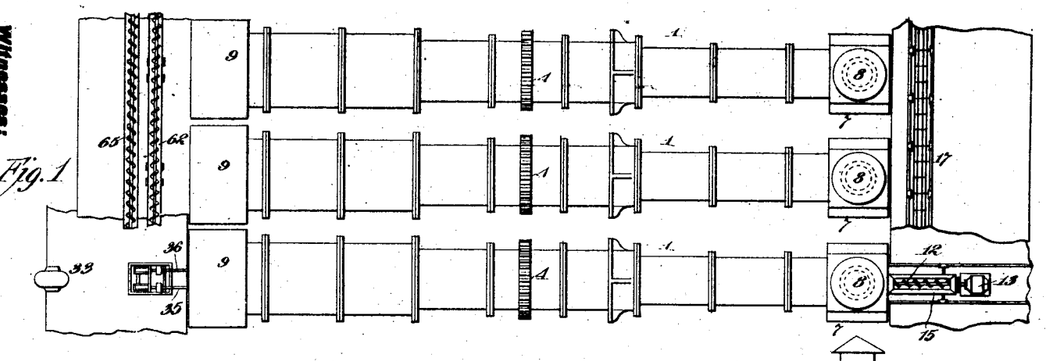
Figure 1 is a plan view, partly in section, showing three burners arranged side by side and illustrating also the feeding devices for one of said burners.
Figure 2:
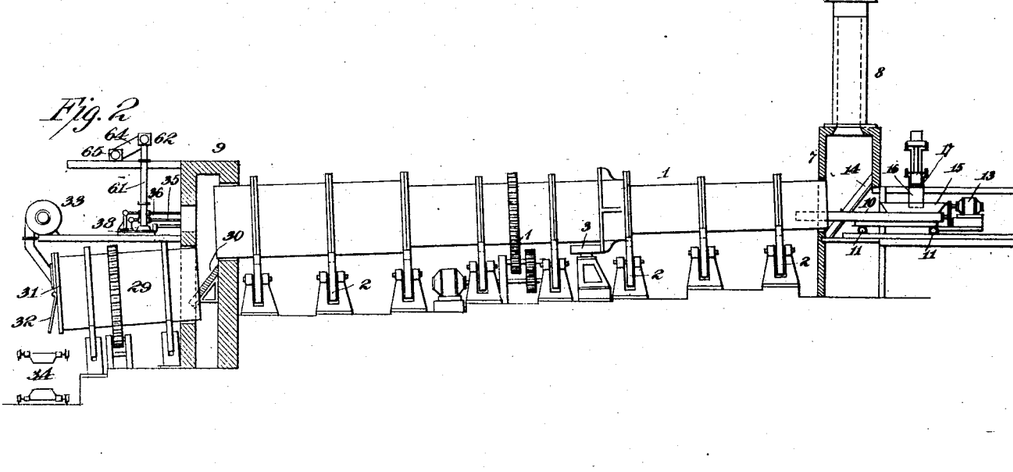
Fig. 2, a side elevation, partly in section, of one of the burners.
Figure 3:
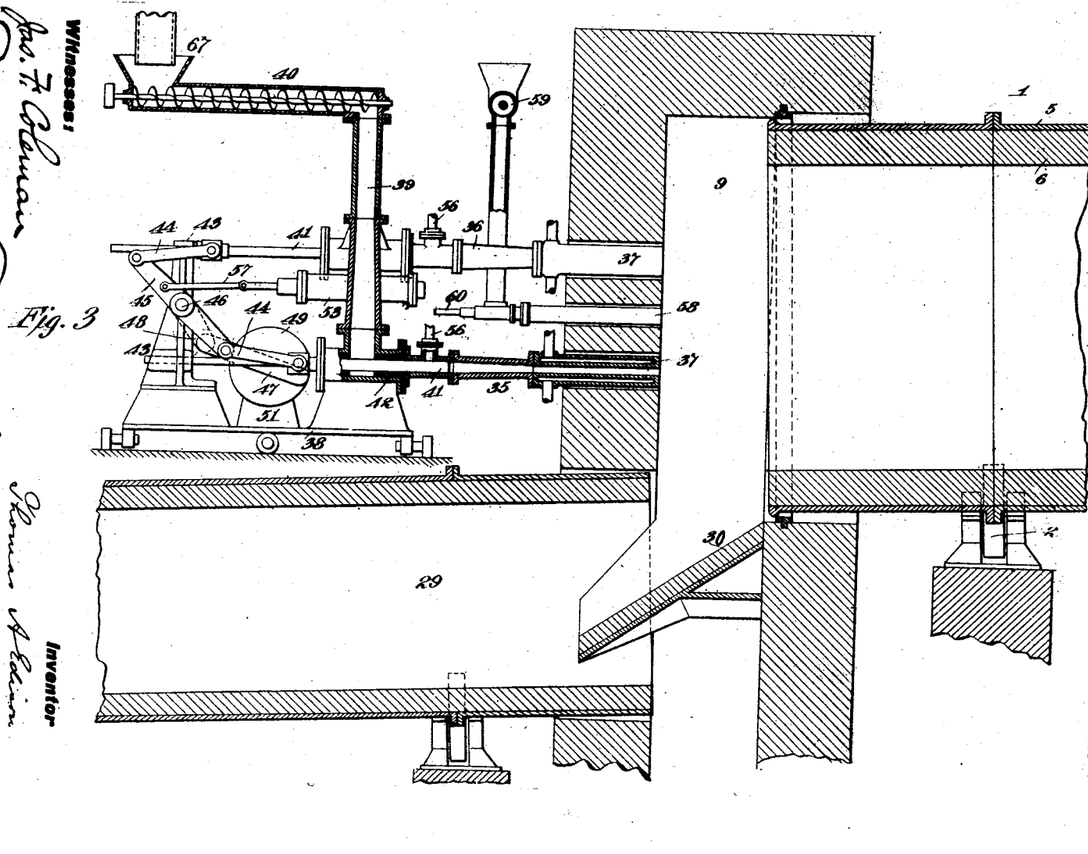
Fig. 3, an enlarged sectional view through the rear end of one of the burners and showing also a part of the cooling-cylinder thereof.
Figure 4:
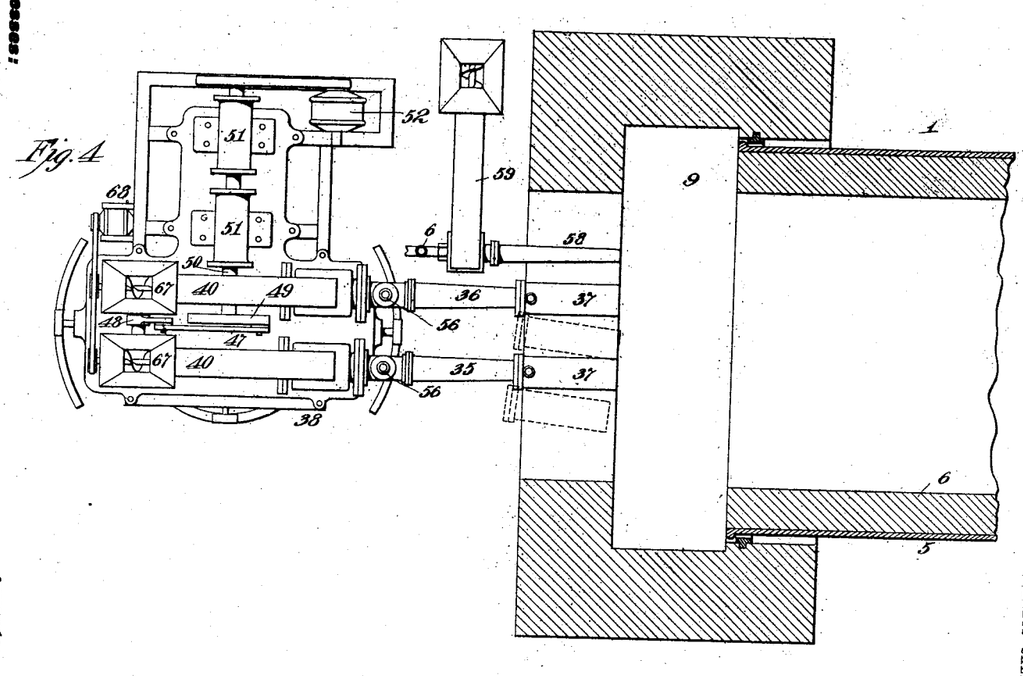
Fig. 4, a section taken at right angles to Fig. 3.
Figure 5:
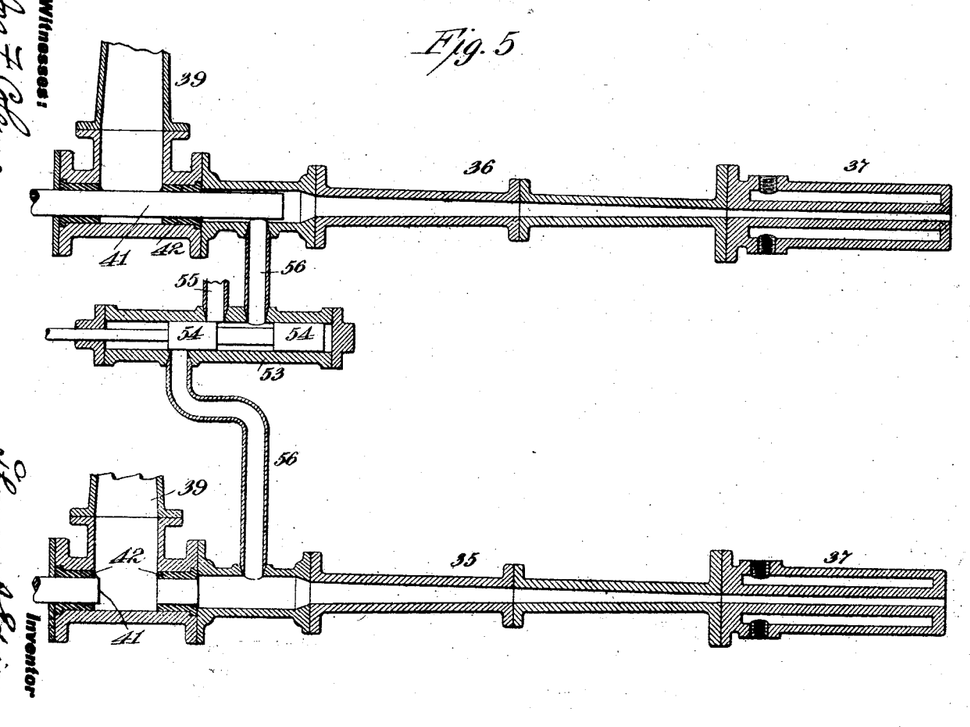
Fig. 5, a detail sectional view illustrating the operation of the two "guns" for feeding the pulverized fuel to each burner.

Mounted in the rear wall of the chamber 9, opposite the large end of each burner, are the devices for feeding pulverized fuel to the same. I employ for this purpose a pair of pneumatic guns which project the fuel into the burner by a series of successive puffs or impulses. These guns 35 and 36 are tubular in form, tapering toward the forward ends, the latter being protected by twyers 37, in which water circulates. The guns are carried on a suitable turn-table 38 or are otherwise mounted so that their axes can be varied with respect to that of each burner, as will be explained. Leading into each of the guns, near the breech thereof, is a tube 39, communicating at its upper end with a screw conveyer 40. A piston 41 is arranged in each gun and is adapted to reciprocate between the two extremes. (Shown in Fig. 5.) Each piston works between two sleeves 42, which can be removed when worn. The pistons or plungers 41 extend rearwardly and are mounted in bearings 43, carried on the turn-table 38, and each is connected by a link 44 with an arm 45 on a rock-shaft 46. This rock-shaft is oscillated by a link 47, connected with an arm 48 on the rock-shaft, and at its other end with the wrist-pin on a crank-disk 49, the latter being mounted on a shaft 50, mounted in dust-proof bearings 51 and driven from a suitable motor 52. The rotation of the shaft 50 therefore oscillates the rock-shaft 46 and moves the pistons or plungers 41 back and forth within the rear ends of the guns 35 and 36, as will be obvious, successively permitting communication between the gun-barrel and the tube 39, whereby pulverized fuel in each of said tubes will on the forward stroke of the piston or plunger be forced into its respective barrel. A single valve-chamber and valve control the supply of compressed air to the two guns. This valve-chamber 53 (see Fig. 5) is provided with a balanced valve 54, in constant communication with a compressed-air-supply pipe 55, and which successively uncovers the pipes 56, leading to the two guns. The valve 54 is connected by a link 57 with one of the arms 45 on the rock-shaft 46.

In addition to employing the two guns 35 and 36, which are preferably swiveled, as explained, I also prefer to make use of a smaller feeding-nozzle 58, water-jacketed at its forward end, supplied with pulverized fuel from a screw conveyer 59 and having a compressed-air pipe 60 opening in its breach for blowing a continuous stream of pulverized fuel into the burner. This small auxiliary feeding-nozzle is employed for the purpose of starting the combustion from a suitable wood fire; but it also may be continuously operated when an additional heating effect is desired at the rear portion of the burner.

The two guns 35 and 36 are preferably so arranged that in operation the fuel supplied by one of them will be projected to a greater distance within the burner than the fuel supplied by the other, so that the combustion zones of the two guns will overlap, as I describe in United States Letters Patent No. 759,357, granted May 10, 1904, whereby I am enabled to secure a more efficient clinkering effect than if such combustion zones were not partially coincident. This result may be secured either by placing one gun above the other, as shown, or by so throttling the air-pipe 56 of one that its trajectory will be less than that of the other. I prefer to mount the guns 35 and 36 so that their axes may be changed with respect to that of the burner in order that the position of the maximum-heat zone may be varied longitudinally of the burner to suit the special conditions of use. Thus it will be seen that if the guns are pointing directly parallel with the longitudinal axis of the burner the fuel will be projected to the maximum distance therein, but that if the guns are moved to one side or the other to a greater or less extent the fuel will strike the side walls of the burner, and thereby be checked in its forward movement, thus causing the maximum-heat zone to recede. In this way a very delicate and accurate adjustment of the heat can be secured.

Fuel is fed to the conveyers 40 in any suitable way—as, for example, through the feed-spouts 61, leading out of a long screw-conveyer trough 62. This conveyer is supplied with pulverized fuel from a supply hopper or reservoir 63 at one end, and any surplus fuel is conveyed from the conveyer through a spout 64 to a return-conveyer 65, from which the surplus fuel passes to an elevator 66 and by the latter is returned to the reservoir 63. The fuel fed along the conveyer 62 will fall through the spouts 61 and fill up the hoppers 67 of the conveyers 40, whereupon the spouts 61 will themselves become filled, and the fuel will be progressed on to the spouts beyond, any surplus returning to the reservoir, as will be understood. In this way the fuel will be automatically supplied to all of the guns and absolutely no attention will be required in connection with the same. I illustrate the conveyers 40 as being driven from a small motor 68 on the turn-table 38.

Figure 11:
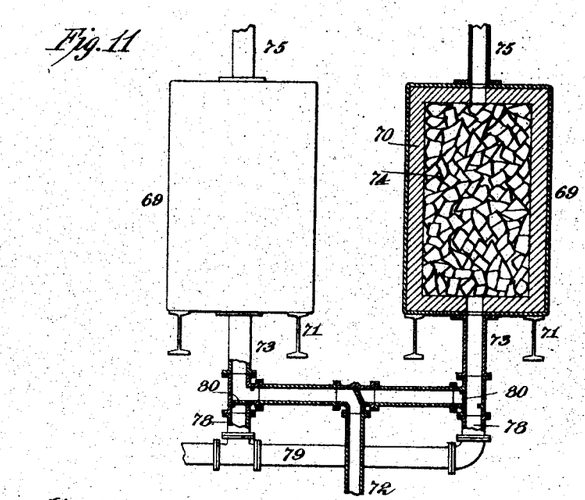
Fig. 11, a vertical sectional view illustrating two regenerators or hot stoves which may be employed in connection with each burner for conserving a part of the heat of the combustion-gases, and Fig. 12 a plan view showing such regenerators as they will be combined and used with their respective burner.
Figure 12:
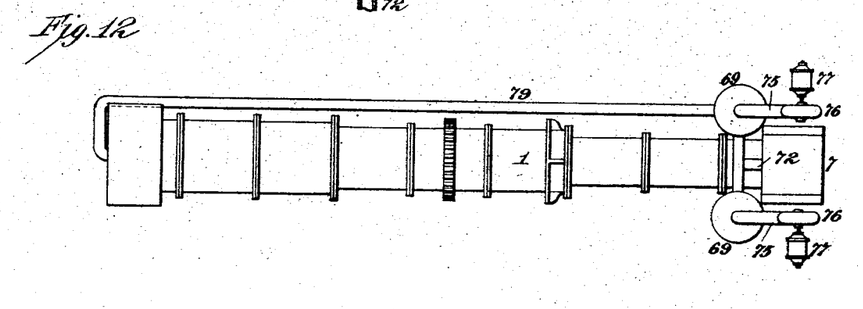

In Figs. 11 and 12 I illustrate the preferred construction of regenerative device which may be applied in connection with each burner for preventing loss of heat in the combustion-gases after they have performed the clinkering operation. Each regenerative device comprises a pair of regenerative cylinders or hot stoves 69, made of cast rings or of boiler-iron, with a fire-brick lining 70. These cylinders are carried on suitable beams 71, either above or to one side of the chamber 7. Leading from the chamber 7 is a flue 72, having branches 73 communicating with the interior of each cylinder. The two cylinders 69 are loosely filled with refractory material 74, preferably broken granite of a size about four inches in diameter. Leading out of the top of each cylinder is a flue 75, connected with a fan or blower 76, each operated by a motor 77, preferably electric. By reversing the direction of rotation of the motors 77 the fans can be alternately used for blowers or exhausters, as will be understood. Leading from the flues 73 are branches 78, which communicate with a tunnel 79, preferably embedded in the ground, so as to be insulated, and the end of which leads either into the rear end of the cooler 29, so as to take the place of the pipe from the fan 33, or it may lead directly to the end of the burner 1, as shown. Dampers or valves 80 are used for cutting off the pipes 73 and 78, as will be evident. It will be understood that when regenerative devices are employed, connecting with the chamber 7, the stack 8 will be dispensed with.

The operation of the device is as follows: A wood-fire is first started in the burner and pulverized coal is blown through the auxiliary nozzle 58 until the burner is well started. Pulverized fuel is also continuously supplied by the conveyer 62 to the hoppers 67 of the several guns, and by means of the feed-screws 40 the tubes 39 of each gun will be kept full of the material. The motor 52 being started, the shaft 50 will be turned, oscillating the rock-shaft 46 and successively withdrawing the plungers 41 of each gun in the rear of the tubes 39 to permit the fuel to fall in front of the withdrawn plunger. As the plunger moves forward the small charge of fuel will be forced into the gun-barrel. As the plunger 41 of the upper gun 36 moves forward (see Fig. 5) the valve 54 will disclose the air-pipe 56 leading to that gun, and a charge of air will therefore enter the same and project the charge of fuel into the burner. As the valve moves in the opposite direction it coincides with the forward movement of the piston of the other gun, in which the same operation is repeated. Thus the fuel will be fed to the burners with a succession of impulses, which, as before stated, are preferably so regulated that the fuel projected from one gun will produce a heat zone which overlaps that of the other gun. If desired, the auxiliary nozzle 58 can be shut off, or when an increased heating effect at the lower end of the burner is desired the feed of fuel can be continued through said auxiliary nozzle. When the burner has thus been started, cement material is continuously supplied to the hoppers 15 of the several feeding devices, and the feed-screws 12 thereof introduce the uncalcined material into the upper end of the several burners, which in rotating will cause the material to progress slowly toward its lower or rear end through the intense heat of the burning fuel, thereby effectively calcining the material. The burners 1 are very long, so that before the fresh material reaches a zone of effective temperature it has the opportunity of robbing the combustion-gases passing to the stack 8 of a portion of their heat, so as to thereby reduce the temperature of said gases. After the material has been thus burned it drops out of the lower end of the burners onto the shelf 30 and falls into the cooling-cylinder 29, in which it is met by cold air from the blower 33. A large part of the heat from the calcined material is taken up by this air, which consequently enters the burner in a highly-heated, and therefore desirably efficient, condition. At the same time the calcined material will be sufficiently cooled to enable it to be transported safely by the conveyers 34. When regenerative devices are used at the upper end of the burner, as shown in Figs. 11 and 12, one of the dampers 80 will be moved to open the flue 73, leading into one of the cylinders, closing the flue 78 immediately below, and the other damper will be moved to close the flue 73, leading to the other regenerative cylinder, opening the flue 78 adjacent thereto. The motor 77 for operating the fan of the former cylinder will be rotated to work the fan as an exhauster, the other fan being worked as a blower. It will thus be seen that the hot combustion gases from the burner will be drawn through one of the regenerative cylinders, so as to intensely heat the refractory material 74 therein. Air is being blown through the other cylinder, absorbing heat from the refractory material in the same and passing through the tunnel 79 into the cooler 29, from whence it passes into the burner. When the refractory material in the regenerative cylinder first referred to is sufficiently heated and the heated refractory material in the other cylinder sufficiently cooled, the motors and dampers are reversed, so that the products of combustion will be directed through the second cylinder and air will be blown downwardly through the first cylinder. In this way the refractory material in the two regenerative cylinders will be alternately heated by the combustion-gases and cooled by air passing through the same on its way to the lower end of the burner, as will be understood.

It will be observed that the apparatus as a whole is simple and efficient in construction, entirely automatic, and of relative economy of operation, since heat which is now lost in the combustion-gases is absorbed by the fresh material passing through the upper portions of the burner, and heat which is now lost in the calcined material is retained by being taken up by the air entering the burner at its lower end.

Having now described my invention, what I claim as new, and desire to secure by Letters Patent, is as follows:

1. In a clinkering or incinerating apparatus, the combination with a long slightly-inclined tubular burner, of a feed-trough extending into the bore of said burner at its upper end and close to the bottom thereof, said trough being freely movable out of said burner in a horizontal direction, a support for said trough in its in and out positions and means for forcing unburned material through said trough, substantially as set forth.

2. In a clinkering or incinerating apparatus, the combination with a long slightly-inclined tubular burner, of an open-top feed-trough extending into the bore of said burner at its upper end and close to the bottom thereof, said trough being freely movable out of said burner, a support for said trough in its in and out positions, a conveyer in said trough, and means for supplying unburned material to said trough, substantially as set forth.

3. In a clinkering or incinerating apparatus, the combination with a long slightly-inclined tubular burner, of an open-top feed-trough extending into the bore of said burner and freely movable entirely away from said burner, a conveyer in said trough, a hopper above said conveyer, and a conveyer for supplying unburned material to said trough, the open top of said hopper being of sufficient extent as to be capable of receiving unburned material from the conveyer throughout a considerable range of movement of the feed-trough, substantially as set forth.

4. In a clinkering or incinerating apparatus, the combination with a long slightly-inclined tubular burner, and a stationary stack-chamber into which the upper end of the burner extends, of a feed-trough extending through said stack-chamber into the bore of the burner and close to the bottom thereof, said feed-trough being freely movable entirely away from said burner and stack-chamber in a horizontal direction, and means outside of the stack-chamber for supplying unburned material to said feed-trough, substantially as set forth.

5. In a clinkering or incinerating apparatus, the combination of a long, rotating, approximately horizontal burner, means for supplying unburned material to the same at its upper end, a pair of regenerative cylinders alternately connected with the burner at its upper end, means for alternately connecting said cylinders with the lower end of said burner, and a reversible fan connected with each of said cylinders for exhausting combustion-gases therefrom or blowing air therein, substantially as set forth.

6. In a clinkering or incinerating apparatus, the combination of a long, approximately horizontal, tubular burner, and a plurality of pneumatically-operated fuel-feeding devices for blowing pulverized fuel in said burner, said feeding devices being simultaneously adjustable with respect to the longitudinal axis of the burner, substantially as set forth.

7. In a clinkering or incinerating apparatus, the combination of a long, approximately horizontal, tubular burner, a main pneumatic feeding device for blowing pulverized fuel into said burner, and an auxiliary feeding device for forcing a reduced charge of pulverized fuel therein, substantially as set forth.

8. In a clinkering or incinerating apparatus, the combination of a long, approximately horizontal, tubular burner, a main pneumatic feeding device for blowing pulverized fuel into said burner, means for adjusting said feeding device with respect to the longitudinal axis of the burner, and an auxiliary feeding device for forcing a reduced charge of pulverized fuel therein, substantially as set forth.

9. In a clinkering or incinerating apparatus, the combination of a long, approximately horizontal, tubular burner, a pneumatic feeding device for blowing intermittent charges of pulverized fuel into said burner, and an auxiliary feeding device for forcing a continuous charge of pulverized fuel therein, substantially as set forth.

10. In a clinkering or incinerating apparatus, the combination of a long, approximately horizontal, tubular burner, a pair of fuel-feeding devices swiveled with respect to the burner, and an auxiliary fuel-feeding device fixed in relation to said burner, substantially as set forth.

11. In a clinkering or incinerating apparatus, the combination of a long, approximately horizontal burner, a plurality of fuel-feeding devices for feeding pulverized fuel into said burners, means for operating said feeding devices so as to cause the heating zones derived therefrom to overlap, and an auxiliary feeding device for forcing a reduced supply of pulverized fuel into the burner, substantially as set forth.

12. In a clinkering or incinerating apparatus, the combination of a long, approximately horizontal, tubular burner, a plurality of fuel-feeding devices for intermittently feeding pulverized fuel into said burner, means for operating said feeding devices so as to cause the heating zones derived therefrom to overlap, and an auxiliary feeding device for forcing a continuous supply of pulverized fuel into the burner, substantially as set forth.

13. In a clinkering or incinerating apparatus, the combination of a tubular burner, a feeding-gun pointing into said burner, a plunger for directing successive charges of pulverized fuel into said gun, and means for admitting compressed air to the gun coincident with the operative stroke of said plunger, substantially as set forth.

14. In a clinkering or incinerating apparatus, the combination of a tubular burner, a pair of feeding-guns pointing into said burner, a plunger for each gun, means for operating said plungers in alternation, and means for successively admitting compressed air to said guns, substantially as set forth.

15. In a clinkering or incinerating apparatus, the combination of a tubular burner, an intermittently-operating pneumatic gun for projecting pulverized fuel into said burner, and means for swiveling said gun, substantially as set forth.

16. In a clinkering or incinerating apparatus, the combination of a tubular burner, an intermittently-operating pneumatic gun for projecting pulverized fuel into said burner, means for swiveling said gun, and an auxiliary fuel-feeding device for feeding fuel continuously into said burner, substantially as set forth.

17. In a clinkering or incinerating apparatus, the combination of a tubular burner, a pair of intermittently-operating pneumatic guns pointed into the burner for feeding pulverized fuel thereto, a plunger in each gun, connections between said plungers, and an air-valve for admitting air successively to the guns, substantially as set forth.

18. In an apparatus of the character described, a feed-trough mounted on wheels and carrying a conveyer and a motor for driving the same whereby all may be moved together, substantially as set forth.

19. In apparatus for burning Portland cement, the combination with a slightly-inclined rotary tubular kiln, of a substantially horizontal conveyer for forcibly introducing material into the kiln at its upper end, the delivery end of said conveyer being adjacent to the bottom of the kiln, substantially as set forth.

20. In apparatus for burning Portland cement, the combination with a long rotary kiln, and a stack-chamber at the upper end thereof for carrying off the products of combustion, of a conveyer extending through said stack-chamber approximately parallel with the longitudinal axis of the kiln for introducing material into the kiln and with its delivery end adjacent to the bottom of the kiln, substantially as set forth.

This specification signed and witnessed this 24th day of December, 1901.

THOMAS A. EDISON.

Witnesses:
FRANK L. DYER,
J. F. RANDOLPH.